United States Patent [19]

Murphy

[11] Patent Number: 5,644,711
[45] Date of Patent: Jul. 1, 1997

[54] MULTI-PRIVILEGED LEVEL DIRECTORY ACCESS ON THE AT&T WORLDWORXSM PERSONAL CONFERENCING SERVICE

[75] Inventor: Sean T. Murphy, Portland, Oreg.

[73] Assignee: Intel Corporation, Santa Clara, Calif.

[21] Appl. No.: 451,754

[22] Filed: May 26, 1995

[51] Int. Cl.$^6$ .................................................. G06F 15/16
[52] U.S. Cl. ...................... 395/188.01; 380/4; 380/25
[58] Field of Search ........................... 395/188.01, 148, 395/600, 490, 491, 186, 421; 380/3, 4, 25, 23; 379/53, 88, 93, 202

[56] References Cited

U.S. PATENT DOCUMENTS

| | | | |
|---|---|---|---|
| 4,625,081 | 11/1986 | Lotito et al. | 379/88 |
| 4,686,698 | 8/1987 | Tompkins et al. | 379/53 |
| 5,075,845 | 12/1991 | Lai et al. | 395/425 |
| 5,185,857 | 2/1993 | Rozmanith et al. | 395/148 |
| 5,191,611 | 3/1993 | Lang | 380/25 |
| 5,410,691 | 4/1995 | Taylor | 395/600 |
| 5,434,913 | 7/1995 | Tung et al. | 379/202 |
| 5,455,953 | 10/1995 | Russell | 395/739 |
| 5,495,607 | 2/1996 | Pisello et al. | 395/600 |
| 5,524,141 | 6/1996 | Braun et al. | 379/93 |

*Primary Examiner*—Robert W. Beausoliel, Jr.
*Assistant Examiner*—Ly V. Hua
*Attorney, Agent, or Firm*—Blakely, Sokoloff, Taylor & Zafman

[57] ABSTRACT

A method and an apparatus for protection of a private directory such as those provided by AT&T®'s WorldWorx$^{SM}$ Personal Conferencing Service in a wide area network. A directory is protected through a requirement of a valid user identification number and matching password providing access rights to certain secured directory information residing in the wide area network.

10 Claims, 5 Drawing Sheets

MULTI-PRIVILEGED LEVEL DIRECTORY ACCESS ON THE AT&T WORLDWORXSM PERSONAL CONFERENCING SERVICE

BACKGROUND OF THE INVENTION (1) Field of the Invention

The present invention is related to the field of service networks and secured directory access, more specifically, to multi-privileged level directory access on the AT&T WorldWorx<sup>SM</sup> Personal Conferencing Service.

(2) Prior Art

For many companies, internal user directories are considered to be proprietary information for internal use only. It is typically necessary to restrict access to this type of information to prevent, for example, head hunter calls. Currently, all electronic directories are a flat file structure. With electronic directories migrating to wide area networks (WANs) such as AT&T WorldWorx<sup>SM</sup> Personal Conferencing Service, directories will be accessed by a larger more heterogeneous group of users. It is therefore desirable to be able to restrict directory access to those who have the proper security access. In this way, a company's enterprise directory or directories can exist or be replicated in the WAN without harboring undue security risks.

BRIEF SUMMARY OF THE INVENTION

A method and an apparatus for protection of a directory such as those provided by AT&T®'s WorldWorx<sup>SM</sup> Personal Conferencing Service in a wide area network are disclosed. A directory is protected through a requirement of a valid user identification number and matching password providing access rights to certain secured directory information residing in the wide area network. A user identification number, a matching password and a directory query request are transmitted from a user endpoint such as a personal computer to the wide area network. Once the user identification number and matching password are verified, they enable access to the WorldWorx<sup>SM</sup> services, and in particular, to the general purpose directory. In addition, the unique user identification and matching password define which private directories a user has access to.

The queried item is located by searching the network databases after the user identification number and matching password are verified for access. The queried item located is then transmitted to the user endpoint only if the user identification number and the matching password allow the user access to the specific private directory in the wide area network which contains the queried item. Thus, the present inventions method and apparatus for multi-privileged directory access to a network for directory information provides for an initial access to the databases containing the directories and a final access to a specific directory only if the provided user identification code and matching password allow access to the specific directory or directories.

DETAILED DESCRIPTION OF THE INVENTION

A method and an apparatus for providing a multi-privileged level directory access for a computer interfaced with a Wide Area Network (WAN) allowing for a user to access public as well as secured directory information are disclosed.

Figure 1:
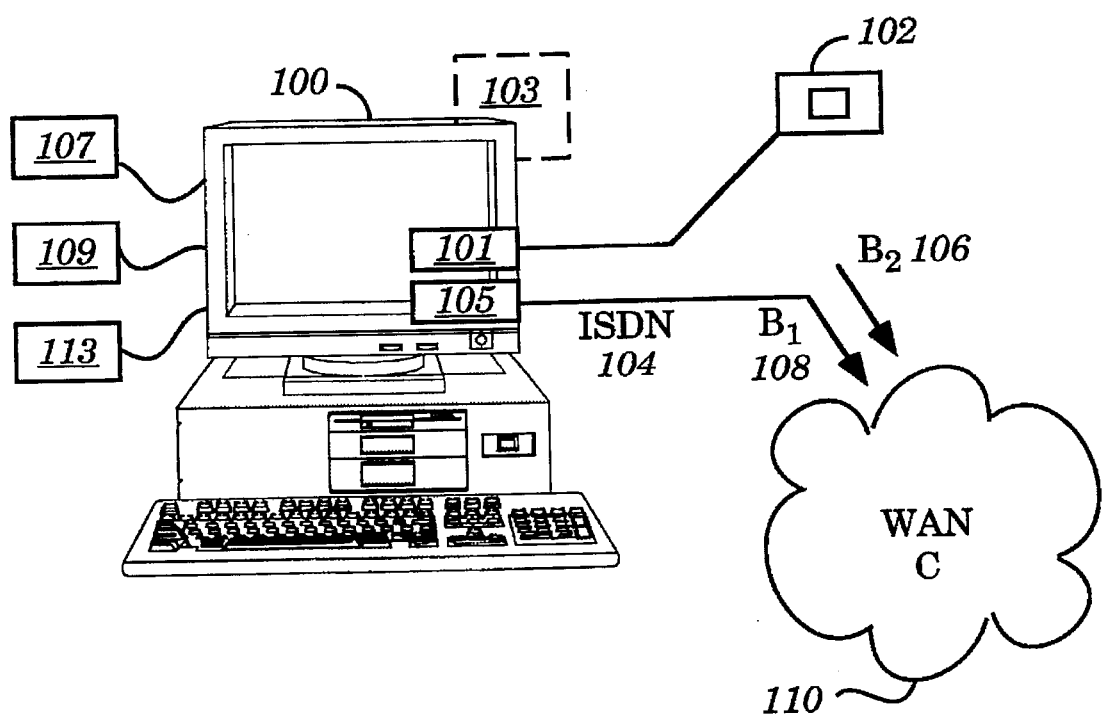
FIG. 1 is a system block diagram illustrating an exemplary embodiment of the present invention with a PC interfaced with a WAN.

FIG. 1 illustrates a system block diagram of the present invention. For many companies, internal user directories are considered to be proprietary information for internal use only. Electronic directories accessible through a WAN may be accessed by a large group of users. It is therefore typically necessary to restrict access to this type of information to prevent, for example, head hunter calls. The method and apparatus of the present invention fills this need by restricting network directory access to those users who have the proper security access.

PC 100 is a user endpoint from which a user query may be made to an electronic directory residing in Wide Area Network (WAN) 110 (hereinafter referred to as Service 110). PC 100 is capable of allowing video/audio conferencing between a user on PC 100 and a user on a remote PC through, for example, Service 110. PC 100 may have ISDN (integrated services digital network) board 105 and video board 101. Video board 101 is connected to camera 102 and performs video decompression. ISDN board 105, handles audio, video and data transmission as well as the reception, compression and decompression of audio signals. Speaker 107, head phone 109 and microphone 113 may be connected to ISDN board 105. PC 100 also has personal conferencing module 103 running which handles video compression and the displaying of video on PC 100. Personal conferencing module 103 may be implemented by using software applications such as ProShare® software, AT&T Vistium 1200®, PictureTel PCS 50®, Creative Labs Share Vision PC3000® and Vivo 320®.

Utilizing the services provided by a given Multi-Conferencing Unit (MCU) located either in a user endpoint or in Service 110 provided by a service provider such as AT&T®, personal conferencing module 103 may connect a user with Service 110 and allow exchange of information amongst a large number of other personal conferencing users simultaneously. Network user information may be used when preparing for a personal conference with other network users and may be accessed through various network directories residing in Service 110. It is useful to have the secured access capability of the present invention to restrict access to these directories since some users may like to have their network user information to be confidential. In addition, as was described earlier, some companies may want to restrict access to their network directories to prevent, for example, head hunter calls.

Figure 2:
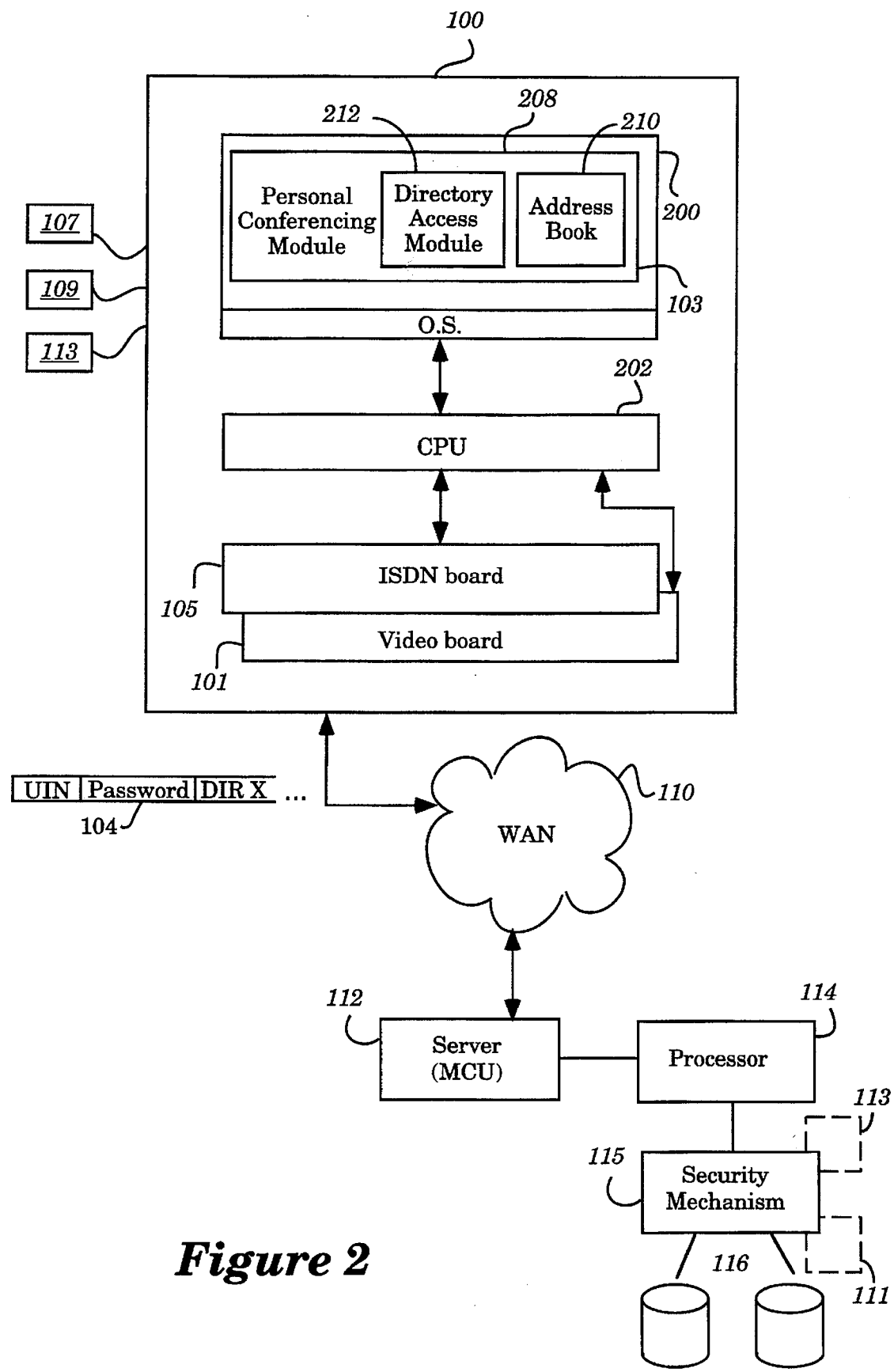
FIG. 2 illustrates the invention as it resides on the PC illustrated in FIG. 1.

FIG. 2 illustrates an exemplary hardware and software platform used in implementing the present invention. PC 100, a computer interfaced with Service 110 (WAN) and having audio/video conferencing capabilities has Directory Access Module 212. Service 110 has Network Directory Security Mechanism 115 which is utilized to restrict network directory access by a user on PC 100. More specifically, a secured access to a network directory on server 112 allows a company to place their electronic directory on a WAN for a network user's retrieval of directory information without endangering the security of proprietary directory information. The various network directory information available on the directories may be used by a network user to prepare an audio/video conference with another network user.

PC 100 illustrated in FIG. 2 has memory 200 coupled to CPU 202. PC 100 may also have two add in boards, ISDN board 105 and video board 101, and personal conferencing module 103 allowing a user of PC 100 to have an audio/video conference with a user on a remote PC. The boards enable the audio, video and data streams to be transmitted, and multiplexed over the ISDN connections. Some embodiments may utilize audio on one channel and video on another channel. ISDN board 105 handles audio compression and decompression as well as the audio input from a microphone and the audio output to a headset or to speakers. In addition, ISDN board 105 handles the transmission, reception, multiplexing and de-multiplexing of various data including audio, video and text data to and from an ISDN connection as well as the multiplexing of ISDN protocols and the making and breaking of ISDN connections. Video board 101 handles the capture and compression of a video stream originating from camera 102. The add in boards may comprise an Intel® PCS 200 Video Conferencing Service product. Decompression of the video signal is handled by CPU 202.

The decompression of the local and remote video stream is handled by personal conferencing module 103 executed by CPU 202. Personal conferencing module 103 includes address book 210. Address book 210 is accessed to obtain addressing information to prepare a video conference. A user registered with Service 110 (such as AT&T WorldWorx<sup>SM</sup> Personal Conferencing Service) may access a network based directory on server 112 in order to obtain information to prepare a multipoint video conference. Personal conferencing software 103 running on PC 100 along with video board 101 and ISDN board 105 allow for the multi-conferencing between users.

Through Service 110, a single B-channel of ISDN 104 may be coupled to Service 110's Multipoint Conferencing Unit (MCU) 112. A call from PC 100 is relayed through MCU 112 over to processor 114 of Service 110 which handles the directory look-up as requested from PC 100. Processor 114 in conjunction with Network Directory Security Mechanism 115 decodes the user query received from PC 100, verifies the user identification number (UIN) and matching password received from PC 100.

More specifically, directory access module 212 prompts the user of PC 100 for a UIN and password and transmits the same to Service 110. Network Directory Security Mechanism 115 run by processor 114 searches databases 116 for a matching UIN and password. If there are none, processor 114 via MCU 112 returns an error message back to PC 100 and the error message is displayed to the user. Otherwise, a true connection is completed and directory access module 212 displays the verification complete message to the user on the display device of PC 100.

Once PC 100 is connected with Service 110, directory access module 212 prompts the user for a directory search criteria, transmits the directory search criteria to service 110 via ISDN 104. Query portion 111 then scans databases 116 for a match of the received search request. If there are no matches then no match message is transmitted to PC 100 to be displayed to the user.

If there is a match, then table 113 may be scanned to determine if the UIN and matching password allow secured access to the directory containing the matched item. If the UIN and matching password allow access to the directory with the queried item, then the item is returned to PC 100 for user viewing.

There are various ways of implementing the query process and these various search methods may be readily understood by a person skilled in the art. In particular, the directory information may be stored in a single database or multiple directory databases. In the case of a single directory database, if there is a match, then processor 114 through Network Directory Security Mechanism 115 determines whether the UIN and matching password enable the user to see the particular item which matches the particular search criteria. In the case of multiple directories, the UIN and matching password may also have fields associated with them that identify directories to which the UIN and matching password have access to (refer to example 104).

In one embodiment, processor 114 through Network Directory Security Mechanism 115 may search individual directories and only return information to the user if the UIN and matching password permit the user to have access to the information in the particular directories searched. In addition, the access rights may be checked prior to the search in which case, security checks are performed not on the individual directory entries but on individual directories. Because the check is performed prior to the search, all information that match the search criteria may be returned.

For example, server 112 may do a table look-up, or search for the user identification number and matching password after a match is found. Then Network Directory Security Mechanism 115 may perform the matching process attempting to match the user search criteria with items in the directories. Once a match is found, Network Directory Security Mechanism 115 searches for the directory containing the matched information with directories listed in the table. The user identification number and matching password entry for the particular user requesting the directory search criteria must correspond to the directories listed in the table. If there is a match, then processor 114 transmits the requested information to the user through MCU 112 to be displayed on PC 100.

Alternatively, server 112, for example, may do a table look-up, or search for the user identification number and matching password when a user first attempts to connect with Service 110. Then processor 114 may perform the matching process only on directories listed in the table corresponding to the user identification number and matching password entry for the particular user requesting the directory search criteria. In this case, for every match found, processor 114 transmits the requested information to the user through MCU 112 to be displayed on PC 100.

Figure 3A:
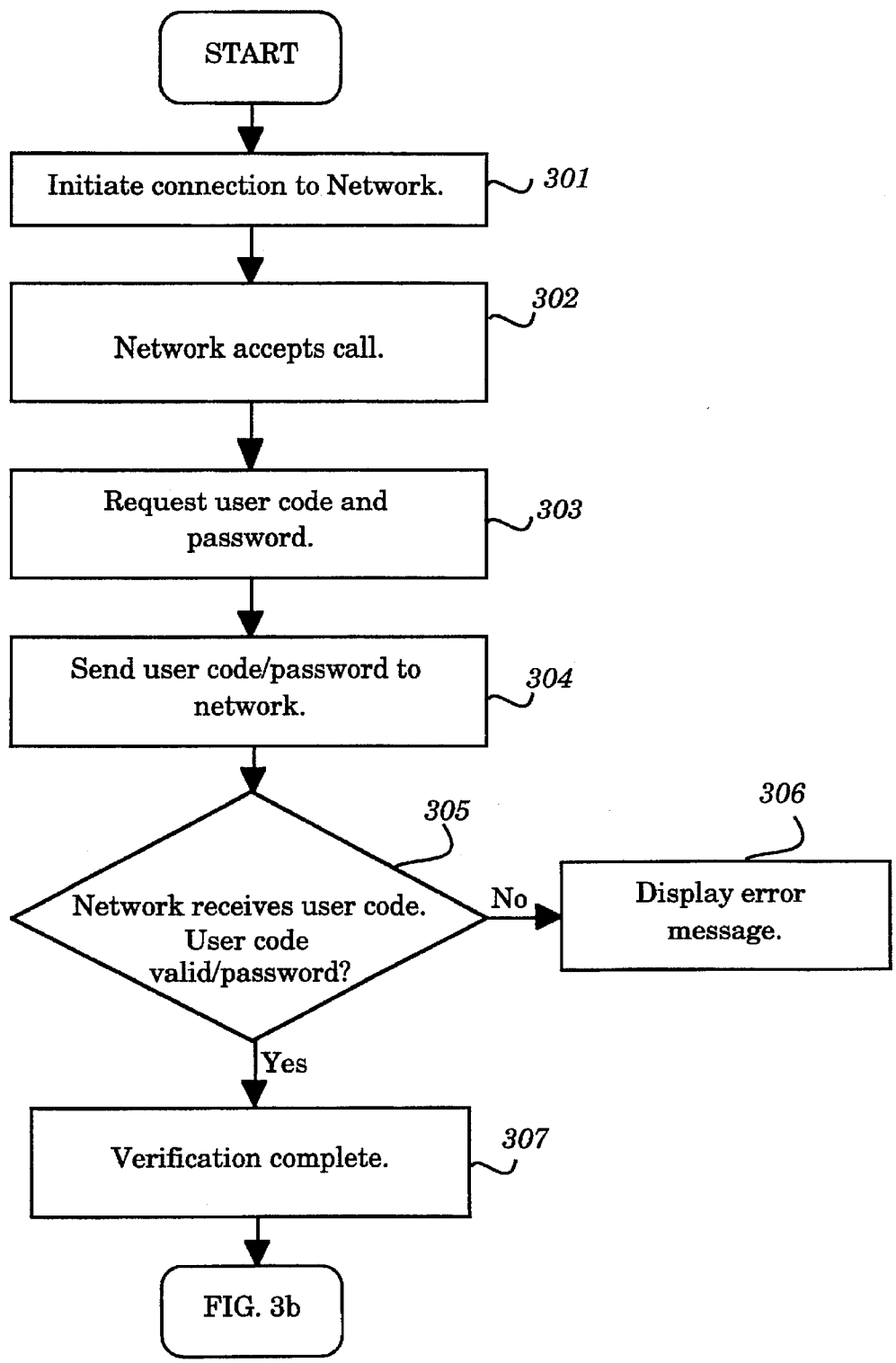
FIGS. 3a and 3b illustrate flow diagrams showing the general steps followed by the method of the present invention.
Figure 3B:
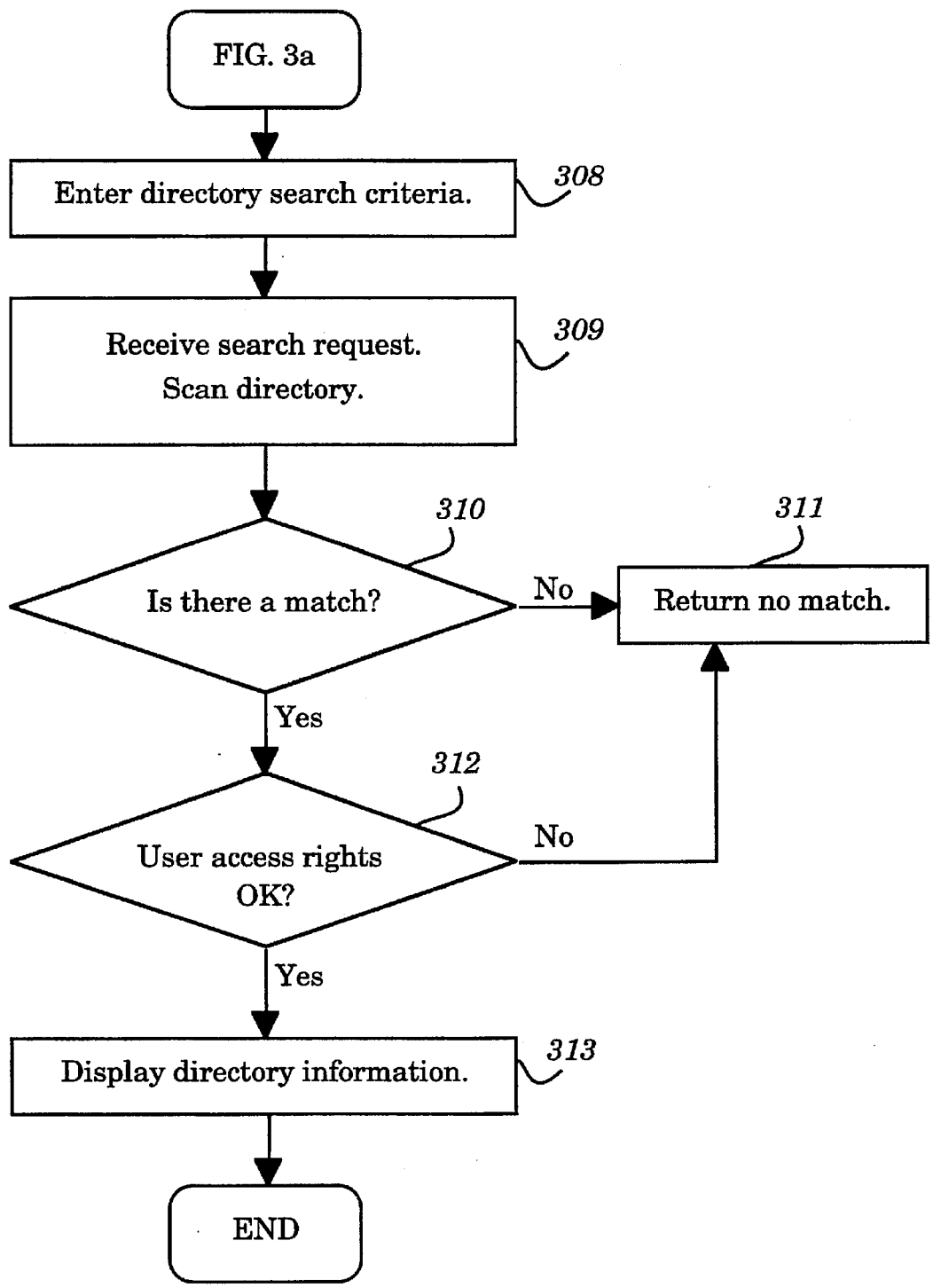

FIGS. 3a and 3b illustrate flow diagrams showing the general steps followed by the method of the present invention. In step 301, a user at their endpoint such as at a PC, attempts to initiate a connection to a network service such as to the AT&T WorldWorx<sup>SM</sup> Personal Conferencing Service. The initiated connection allows a user to prepare a conference or to download information to their local address book from the network service. Typically, this connection is initiated through a graphical user interface (GUI) and an interface software such as Intel® ProShare®. The interface software opens up a single B-channel ISDN connection. A user may then open up a data call such as an ISDN or a POTS (Plain Old Telephone Switch) call to the network service.

The ISDN which may be used in the implementation of the present invention may have multiple channels, e.g. one or two B-channels for exchanging information. In the case of the invention, a single B-channel may be used. In step 302, once the negotiation of the hardware rates and protocols is complete, a connection complete message is displayed to the user on the PC indicating that the interface software has made a connection with the service, and that the user is now able to exchange information with the service.

The network service provider then prompts the user for identification. Information through a data protocol is transmitted from the service provider to the PC and the interface software receiving the information decodes the information and displays a pop-up box prompting the user for a user identification number (UIN) and a password. For example, a prompt may be in the form of: "Welcome to XXX service. Please enter user ID number and password."

In some existing software, such as in the case of Intel® ProShare®, the UIN may be automatically stored assuming that the user initiating the connection to a network service is the sole person assigned to the PC. The network service provider requests a UIN and a matching password of the user in step 303. Upon such prompt by the network service provider through the interface software running on the PC, the user may enter his or her UIN and matching password via a keyboard coupled to the PC. Upon entering a UIN and matching password, the interface software transmits the information to a service provider on the network in step 304.

In step 305, the network receives the UIN and password. In one embodiment, the network server checks the UIN and password to see if they match an entry in their database comprised of valid UINs and matching passwords. In step 306, if the UIN and matching password are invalid, an error message is transmitted to the PC. The error message is then decoded by the interface software running on the PC and is displayed to the user. In step 307, if the UIN and matching password are valid, the verification is complete. The user then receives a message on the PC from the network service provider indicating that the user is logged on to the network.

Once the connection is up, the user may enter a directory query in step 308. The particular query may be presented in one of various ways. In one exemplary method, the network receives a search request from the user in step 309, and the network server via the network processor scans the network databases containing various directories for a match with the item being searched by the user. In step 310, if there is no match, then in step 311 a "no match" message is transmitted back to the PC to the user. Otherwise, in step 312, the network server determines whether or not the UIN and matching password allow the user access rights to the particular directory containing the matched item.

If the UIN and matching password do not allow the user access rights to that particular directory, then a "no match" message is transmitted back to the PC and to the user in step 311. Otherwise, if the UIN and matching password indicate that the user has access rights to the particular directory containing the matched item, then that matched item is transmitted back to the PC and displayed to the user in step 313. In this way, the present invention allows for an extra level of search criteria determining whether the user submitting a query request is entitled to receive the queried information. This extra level of search is currently not performed in a PC based phone book or public directory.

Figure 4:
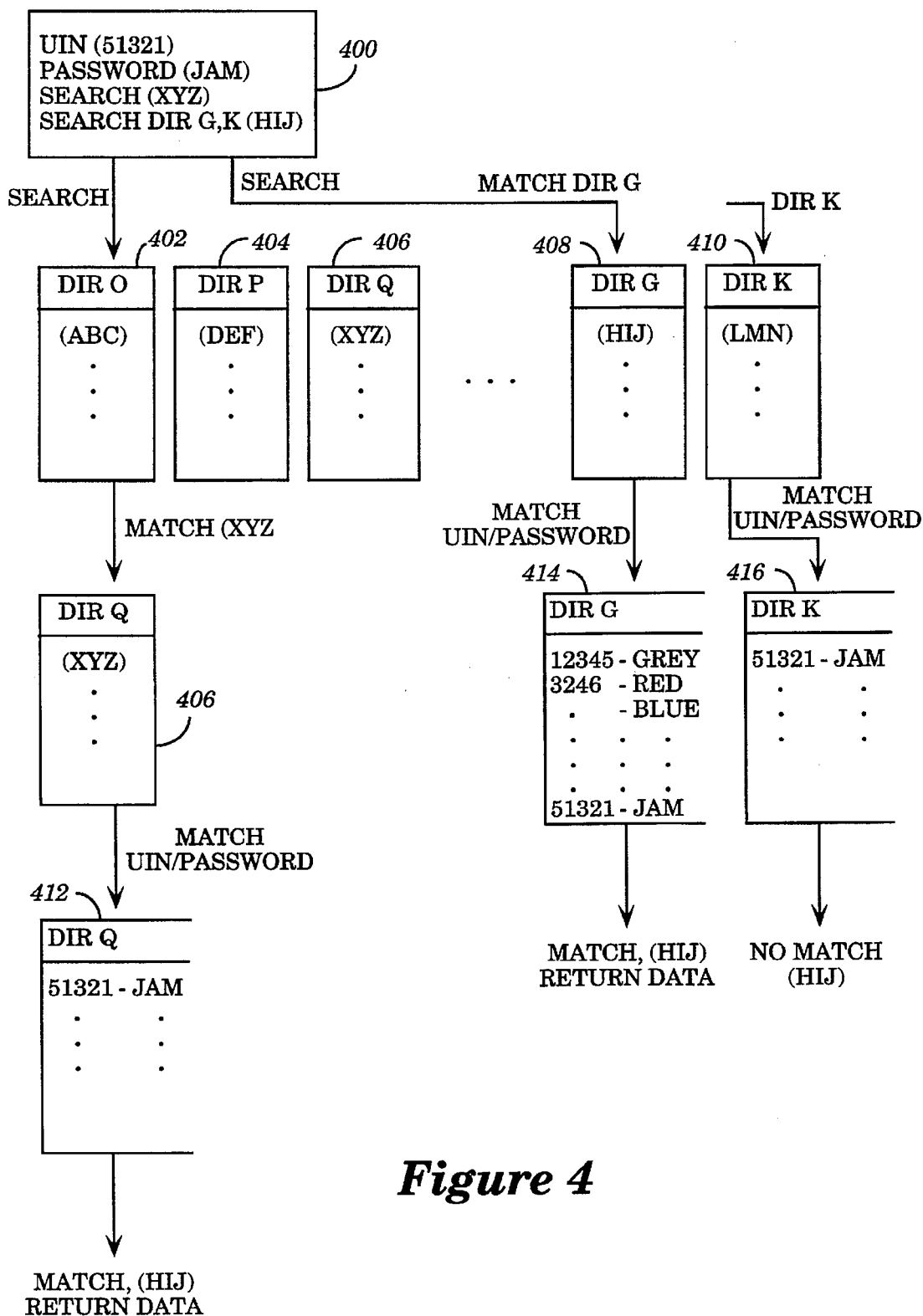
FIG. 4 illustrates an exemplary query diagram.

FIG. 4 illustrates an exemplary query diagram. In one embodiment, a query initiates a search through public directories for the queried item. If the user has access rights to the particular directory the queried information is located in, the queried information is returned to the user. In another embodiment, a search may be performed in a private secured directory in addition to the public directory. In this embodiment, the user specifies which private directory they want searched and it is determined if the user's access rights allows a search in the specified private directory or directories. Thus, a query request along with a user's UIN and password are transmitted to a network.

In the exemplary illustration, items XYZ are searched through exemplary directories 402 through 410. If there is a match, Network Directory Security Mechanism 115 determines whether the user's UIN and password allow the user access rights to the particular directory containing the queried information. Table 412 with a list of UINs and matching passwords allowing access rights to directory 406 is searched. If the user has the proper access rights, then Network Directory Security Mechanism 115 returns the information to the user.

If a search is requested through specific private directories 408 and 410, Network Directory Security Mechanism 115 determines whether the user's UIN and password allow the user access rights to private directories 408 and 410. Tables 414 and 416 with a list of UINs and passwords allowing access to private directories 408 and 410 are searched. If the user has the proper access rights, then Network Directory Security Mechanism 115 searches private directories 408 and 410 and returns the queried information if it is located in one of the specified private directories.

What has been described is a method and an apparatus for a multi-privileged level directory access on the AT&T WorldWorx℠ Personal Conferencing Service.

While certain exemplary embodiments have been described in detail and shown in the accompanying drawings, it is to be understood that such embodiments are merely illustrative of and not restrictive on the broad invention, and that this invention not be limited to the specific arrangements and constructions shown and described, since various other modifications may occur to those ordinarily skilled in the art.

What is claimed:

1. A method for accessing a directory in a wide area network from a computer, said method comprising the steps of:

transmitting a user identification number, a matching password and a directory query request from said computer to said wide area network, said directory query request for requesting an item to be searched in a plurality of directories in said wide area network;

verifying said user identification number and said matching password to determine initial access rights to said plurality of directories;

locating said item to be searched by performing a search in said plurality of directories in said wide area network for said item once said user identification number and said matching password are verified for initial access to said plurality of directories;

verifying said user identification number and said matching password to determine final access rights to a specific directory among said plurality of directories which contains said located item; and returning said located item to said computer if said user identification number and said matching password allow said final access rights to said specific directory in said wide area network which contains said located item.

2. The method of claim 1 wherein said step of transmitting further comprises the step of initiating connection to said wide area network from said computer.

3. The method of claim 1 wherein said step of locating further comprises the step of searching for said specific directory containing said queried item in said wide area network only if said user identification number and said matching password allow access to said specific directory.

4. The method of claim 3 further comprising the step of determining if said user identification number and said matching password allow access to said directory containing said queried item.

5. The method of claim 4 further comprising the step of looking at a table indicating the directories to which said user identification number and said matching password have access rights to.

6. The method of claim 4 further comprising the step of encoding fields in said user identification number and said matching password indicating which directories said user identification number and said matching password have access to.

7. A network system restricting directory access to electronic directories located in a wide area network to users using a computer and having secured access rights, said system comprising:

a plurality of databases having electronic directories;

a storage device comprising, a network directory security mechanism for restricting access to said electronic directories, said network directory security mechanism comprising a table indicating the electronic directories to which access is restricted and the criteria for access to these said electronic directories;

a processor for running said network directory security mechanism, said processor coupled to said storage device; and a multi-point conferencing unit for interfacing said wide area network with said computer, said multi-point conferencing unit coupled to said processor.

8. The system of claim 7 wherein said network directory security mechanism further comprises a search module for searching through said databases for said electronic directories being accessed.

9. A network system restricting directory access to electronic directories located in a wide area network to users using a computer and having secured access rights, said system comprising:

first means for storage storing electronic directories;

second means for storage comprising, means for restricting access to said electronic directories, said means for restricting further comprises means for indicating the electronic directories to which access is restricted, and the criteria for access to these said electronic directories;

means for running said means for restricting, said means for running coupled to said second means for storage; and means for interfacing said wide area network with said computer, said means for interfacing coupled to said means for running.

10. The system of claim 9 wherein said means for restricting further comprises means for searching through said first means for storage for said electronic directories being accessed.

* * * * *

UNITED STATES PATENT AND TRADEMARK OFFICE
CERTIFICATE OF CORRECTION

PATENT NO.    : 5,644,711
DATED         : July 1, 1997
INVENTOR(S)   : Sean T. Murphy It is certified that error appears in the above-identified patent and that said Letters Patent is hereby corrected as shown below:

In column 5 at line 16 delete "senrice" and insert --service--

In column 5 at line 33 delete "senrice" and insert --service--

Signed and Sealed this

Fourth Day of November, 1997

Attest:

Attesting Officer

BRUCE LEHMAN

Commissioner of Patents and Trademarks